United States Patent
Breault et al.

(10) Patent No.: US 12,378,893 B2
(45) Date of Patent: Aug. 5, 2025

(54) BUFFER AIR ASSEMBLY FOR AN AIRCRAFT ENGINE

(71) Applicant: Raytheon Technologies Corporation, Farmington, CT (US)

(72) Inventors: Andrew E. Breault, Bolton, CT (US); William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/224,908

(22) Filed: Jul. 21, 2023

(65) Prior Publication Data

US 2025/0027422 A1    Jan. 23, 2025

(51) Int. Cl.

| | |
|---|---|
| *F01D 11/04* | (2006.01) |
| *F01D 25/12* | (2006.01) |
| *F02C 6/08* | (2006.01) |
| *F02C 7/06* | (2006.01) |
| *F01D 11/06* | (2006.01) |
| *F02C 9/18* | (2006.01) |

(52) U.S. Cl.
CPC ............ *F01D 11/04* (2013.01); *F01D 25/125* (2013.01); *F02C 6/08* (2013.01); *F02C 7/06* (2013.01); *F01D 11/06* (2013.01); *F02C 9/18* (2013.01)

(58) Field of Classification Search
CPC ........ F01D 11/04; F01D 25/125; F01D 11/06; F02C 6/08; F02C 7/06; F02C 9/18
See application file for complete search history.

(56) References Cited

U.S. PATENT DOCUMENTS

| | | | |
|---|---|---|---|
| 10,731,563 B2 | 8/2020 | Munsell | |
| 2011/0203293 A1* | 8/2011 | Glahn | F02C 7/32 60/785 |
| 2013/0192240 A1* | 8/2013 | Munsell | F01D 25/22 60/39.83 |

(Continued)

OTHER PUBLICATIONS

EP Search Report for EP Patent Application No. 24189806.3 dated Dec. 20, 2024.

*Primary Examiner* — Gerald L Sung
*Assistant Examiner* — Rene D Ford
(74) *Attorney, Agent, or Firm* — Getz Balich LLC (57) ABSTRACT

A buffer air assembly for an aircraft engine includes a low-pressure header, a high-pressure header, a low-pressure bleed air source, a high-pressure bleed air source, and an electric buffer compressor. The low-pressure header is connected to at least one low-pressure bearing compartment. The high-pressure header is connected to at least one high-pressure bearing compartment. The low-pressure bleed air source is connected to the low-pressure header. The low-pressure bleed air source is configured to direct a low-pressure buffering air to the at least one low-pressure bearing compartment through the low-pressure header. The high-pressure bleed air source is configured to direct a high-pressure buffering air to the at least one high-pressure bearing compartment through the high-pressure header. The electric buffer compressor is connected to the low-pressure header and the high-pressure header. The electric buffer compressor is configured to direct pressurized buffering air to the low-pressure header and the high-pressure header.

16 Claims, 5 Drawing Sheets

(56) References Cited

U.S. PATENT DOCUMENTS

| | | | |
|---|---|---|---|
| 2016/0084111 A1* | 3/2016 | Bei | F01D 11/06 |
| | | | 415/111 |
| 2017/0363099 A1* | 12/2017 | Taylor | F01D 5/02 |
| 2018/0128176 A1 | 5/2018 | Staubach | |
| 2020/0355121 A1 | 11/2020 | O'Meallie | |
| 2023/0148411 A1 | 5/2023 | Amari | |

* cited by examiner

BUFFER AIR ASSEMBLY FOR AN AIRCRAFT ENGINE

BACKGROUND

1. Technical Field

This disclosure relates generally to a buffer air assembly for an aircraft engine and, more particularly, to a buffer air assembly including an electric buffer compressor.

2. Background Information

Rotational equipment, such as a gas turbine engine for an aircraft propulsion system, may include a buffer air assembly for providing buffer air to one or more bearing compartments of the rotational equipment. Various types and configurations of buffer air assemblies are known in the art. While these known buffer air assemblies have various advantages, there is still room in the art for improvement. There is a need in the art, therefore, for an improved buffer air assembly for rotational equipment.

SUMMARY

It should be understood that any or all of the features or embodiments described herein can be used or combined in any combination with each and every other feature or embodiment described herein unless expressly noted otherwise.

According to an aspect of the present disclosure, a buffer air assembly for an aircraft engine includes a low-pressure header, a high-pressure header, a low-pressure bleed air source, a high-pressure bleed air source, and an electric buffer compressor. The low-pressure header is connected to at least one low-pressure bearing compartment. The high-pressure header is connected to at least one high-pressure bearing compartment. The low-pressure bleed air source is connected to the low-pressure header. The low-pressure bleed air source is configured to direct a low-pressure buffering air to the at least one low-pressure bearing compartment through the low-pressure header. The high-pressure bleed air source is configured to direct a high-pressure buffering air to the at least one high-pressure bearing compartment through the high-pressure header. The electric buffer compressor is connected to the low-pressure header and the high-pressure header. The electric buffer compressor is configured to direct pressurized buffering air to the low-pressure header and the high-pressure header.

In any of the aspects or embodiments described above and herein, the buffer air assembly may further include a buffer switching valve selectively connecting the low-pressure bleed air source and the electric buffer compressor to the at least one low-pressure bearing compartment. The buffer switching valve may be positionable in a first position and a second position. The buffer switching valve may connect the electric buffer compressor to the at least one low-pressure bearing compartment in the first position. The buffer switching valve may connect the low-pressure bleed air source to the at least one low-pressure bearing compartment in the second position.

In any of the aspects or embodiments described above and herein, the buffer air assembly may further include a supply header connecting the low-pressure header and the high-pressure header.

In any of the aspects or embodiments described above and herein, the high-pressure bleed air source and the electric buffer compressor may be connected to the low-pressure header and the high-pressure header by the supply header.

In any of the aspects or embodiments described above and herein, the supply header may include a first check valve, a second check valve, and a common supply header line. The first check valve may connect the electric buffer compressor to the common supply header line. The second check valve may connect the high-pressure bleed air source to the common supply header line.

In any of the aspects or embodiments described above and herein, the electric buffer compressor may include an air inlet and an air outlet. The air inlet may be connected to the high-pressure bleed air source and configured to receive the high-pressure buffering air from the high-pressure bleed air source. The air outlet may be connected to the high-pressure header and the low-pressure header.

In any of the aspects or embodiments described above and herein, the supply header may include a check valve connecting the high-pressure bleed air source to the high-pressure header and the low-pressure header. The check valve may be arranged in parallel with the electric buffer compressor.

In any of the aspects or embodiments described above and herein, the electric buffer compressor may include an air inlet and an air outlet. The air inlet may be connected to the low-pressure bleed air source and configured to receive the low-pressure buffering air from the low-pressure bleed air source. The air outlet may be connected to the low-pressure header.

In any of the aspects or embodiments described above and herein, the buffer air assembly may further include a supply header connecting the low-pressure header and the high-pressure header. The supply header may include a first check valve and a second check valve. The first check valve may connect the electric buffer compressor to the high-pressure header. The second check valve may connect the electric buffer compressor to the low-pressure header.

In any of the aspects or embodiments described above and herein, the electric buffer compressor may include an air outlet. The buffer air assembly may further include a blow-off valve connected at the air outlet.

In any of the aspects or embodiments described above and herein, the buffer air assembly may further include a controller connected in signal communication with the electric buffer compressor. The controller may include a processor in communication with a non-transitory memory storing instructions, which instructions when executed by the processor, may cause the processor to energize the electric buffer compressor to direct the pressurized buffering air to the low-pressure header and the high-pressure header.

In any of the aspects or embodiments described above and herein, the instructions, when executed by the processor, may further cause the processor to deenergize the electric buffer compressor while maintaining the buffer switching valve in the first position subsequent to energizing the electric buffer compressor to direct the pressurized buffering air to the low-pressure header and the high-pressure header.

In any of the aspects or embodiments described above and herein, the instructions, when executed by the processor, may further cause the processor to measure a first pressure of the high-pressure buffering air and deenergize the electric buffer compressor in response to identification of the measured first pressure greater than or equal to a first pressure threshold.

In any of the aspects or embodiments described above and herein, the instructions, when executed by the processor, may further cause the processor to position the buffer switching valve in the second position subsequent to deenergizing the electric buffer compressor.

In any of the aspects or embodiments described above and herein, the instructions, when executed by the processor, may further cause the processor to measure a second pressure of the low-pressure buffering air and position the buffer switching valve in the second position in response to identification of the measured second pressure greater than or equal to a second pressure threshold.

According to another aspect of the present disclosure, an engine for an aircraft includes a low-pressure compressor, a high-pressure compressor, and a buffer air assembly. The buffer air assembly includes a low-pressure header, a high-pressure header, and an electric buffer. The low-pressure header is connected to at least one low-pressure bearing compartment and the low-pressure compressor. The low-pressure header is configured to receive a low-pressure buffering air from the low-pressure compressor. The high-pressure header is connected to at least one high-pressure bearing compartment and the high-pressure compressor. The high-pressure header is configured to receive a high-pressure buffering air from the high-pressure compressor. The electric buffer compressor is connected to the low-pressure header and the high-pressure header. The electric buffer compressor is configured to direct pressurized buffering air to the low-pressure header and the high-pressure header.

In any of the aspects or embodiments described above and herein, the engine may further include a controller connected in signal communication with the electric buffer compressor. The controller may include a processor in communication with a non-transitory memory storing instructions, which instructions when executed by the processor, may cause the processor to control an engine startup sequence for the engine. The engine startup sequence may include energizing the electric buffer compressor to direct the pressurized buffering air to the low-pressure header and the high-pressure header.

In any of the aspects or embodiments described above and herein, the engine may further include a first rotational assembly, a second rotational assembly, at least one high-pressure bearing assembly, and at least one low-pressure bearing assembly. The first rotational assembly may include the high-pressure compressor. The second rotational assembly may include the low-pressure compressor. The at least one high-pressure bearing assembly may rotatably support the first rotational assembly. The at least one high-pressure bearing assembly may be connected to the high-pressure header. The at least one low-pressure bearing assembly may rotatably support the second rotational assembly. The at least one low-pressure bearing assembly may be connected to the low-pressure header.

According to another aspect of the present disclosure, a buffer air assembly for an aircraft engine includes a low-pressure header, a high-pressure header, a supply header, a low-pressure bleed air source a high-pressure bleed air source, and an electric buffer compressor. The low-pressure header is connected to at least one low-pressure bearing compartment. The high-pressure header is connected to at least one high-pressure bearing compartment. The supply header interconnects the low-pressure header and the high-pressure header. The low-pressure bleed air source is connected to the low-pressure header. The low-pressure bleed air source is configured to direct a low-pressure buffering air to the at least one low-pressure bearing compartment through the low-pressure header. The high-pressure bleed air source is connected to the supply header. The high-pressure bleed air source is configured to direct a high-pressure buffering air to the at least one low-pressure bearing compartment and the at least one high-pressure bearing compartment. The electric buffer compressor is connected to the supply header. The electric buffer compressor is configured to direct pressurized buffering air to the at least one low-pressure bearing compartment and the at least one high-pressure bearing compartment.

In any of the aspects or embodiments described above and herein, the buffer air assembly may further include a buffer switching valve disposed between the supply header and the low-pressure header. The buffer switching valve may be positionable in a first position and a second position. The buffer switching valve connects the supply header to the low-pressure header in the first position. The buffer switching valve connects the low-pressure bleed air source to the low-pressure header in the second position.

The present disclosure, and all its aspects, embodiments and advantages associated therewith will become more readily apparent in view of the detailed description provided below, including the accompanying drawings.

DETAILED DESCRIPTION

Figure 1:
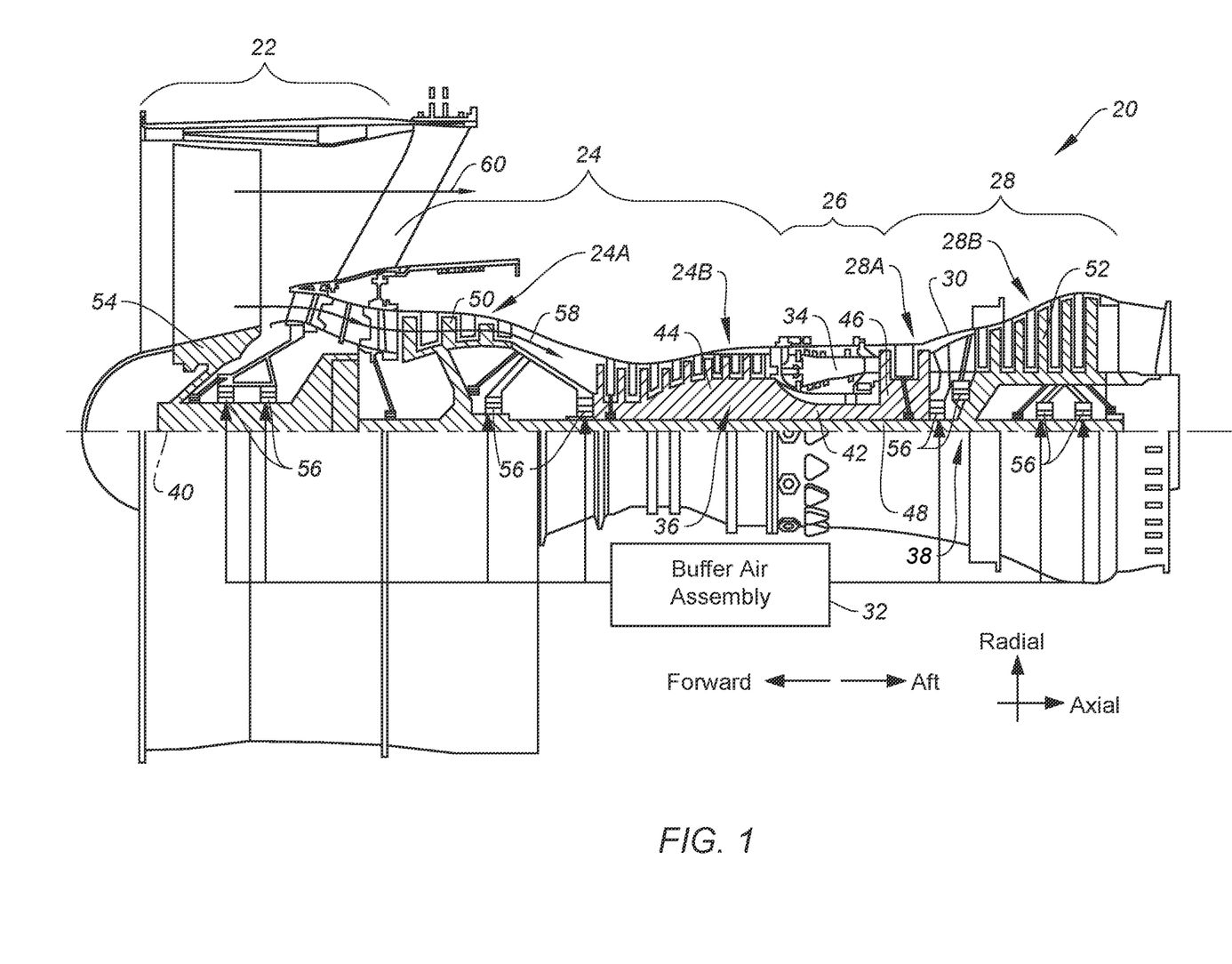
FIG. 1 schematically illustrates a cutaway view of an engine for an aircraft propulsion system, in accordance with one or more embodiments of the present disclosure.

FIG. 1 schematically illustrates an engine 20. The engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, the present disclosure may also be equally applicable to other types of engines including, but not limited to, rotary engines (e.g., Wankel engines), piston engines, or the like.

The engine 20 of FIG. 1 includes a fan section 22, a compressor section 24, a combustor section 26, a turbine section 28, and engine static structure 30, and a buffer air assembly 32. The compressor section 24 of FIG. 1 includes a low-pressure compressor (LPC) 24A and a high-pressure compressor (HPC) 24B. The combustor section 26 includes a combustor 34 (e.g., an annular combustor). The turbine section 28 includes a high-pressure turbine (HPT) 28A and a low-pressure turbine (LPT) 28B.

Components of the fan section 22, the compressor section 24, the combustor section 26, and the turbine section 28 form a first rotational assembly 36 (e.g., a high-pressure spool) and a second rotational assembly 38 (e.g., a low-pressure spool) of the engine 20. The first rotational assembly 36 and the second rotational assembly 38 are mounted for rotation about an axial centerline 40 (e.g., a rotational axis) of the engine 20 relative to the engine static structure 30 of the engine 20.

The first rotational assembly 36 includes a first shaft 42, a bladed first compressor rotor 44 for the high-pressure compressor 24B, and a bladed first turbine rotor 46 for the high-pressure turbine 28A. The first shaft 42 interconnects the bladed first compressor rotor 44 and the bladed first turbine rotor 46.

The second rotational assembly 38 includes a second shaft 48, a bladed second compressor rotor 50 for the low-pressure compressor 24A, and a bladed second turbine rotor 52 for the low-pressure turbine 28B. The second shaft 48 interconnects the bladed second compressor rotor 50 and the bladed second turbine rotor 52. The second shaft 48 may additionally be directly or indirectly coupled to a bladed fan rotor 54 for the fan section 22. For example, the second shaft 48 may be coupled to the bladed fan rotor 54 (e.g., an input shaft of the bladed fan rotor 54) by a reduction gear assembly configured to drive the bladed fan rotor 54 at a reduced rotational speed relative to the second shaft 48.

The engine static structure 30 may include one or more engine cases, cowlings, bearing assemblies, and/or other non-rotating structures configured to house and/or support components of the engine 20 sections 22, 24, 26, 28. The engine static structure 30 of FIG. 1 includes a plurality of bearing assemblies 56 for rotationally supporting components of the first rotational assembly 36 and/or the second rotational assembly 38. It should be understood that bearing assemblies, such as the bearing assemblies 56, may be provided at various additional or alternative locations of the engine 20.

In operation of the engine 20 of FIG. 1, ambient air is directed through the fan section 22 and into a core flow path 58 and a bypass flow path 60 by rotation of the bladed fan rotor 54. Airflow along the core flow path 58 is compressed by the low-pressure compressor 24A and the high-pressure compressor 24B, mixed and burned with fuel in the combustor 34, and then directed through the high-pressure turbine 28A and the low-pressure turbine 28B. The bladed first turbine rotor 46 and the bladed second turbine rotor 52 rotationally drive the first rotational assembly 36 and the second rotational assembly 38, respectively, in response to the combustion gas flow through the high-pressure turbine 28A and the low-pressure turbine 28B. The first shaft 42 and the second shaft 48 are concentric and rotate about the axial centerline 40 supported by the bearing assemblies 56.

During operation of an engine, such as the engine 20, pressurized bleed air from a compressor section (e.g., an LPC and/or an HPC) of the engine may be directed to a bearing compartment for one or more bearing assemblies. This pressurized bleed air may be referred to as "buffer air." The buffer air may be directed to the bearing compartment to facilitate the operation of bearing compartment seals, thereby providing sealing for the bearing compartment. For example, the buffer air may be directed to the bearing compartment to ensure a sufficiently positive differential pressure across the bearing compartment seals to prevent oil leakage ("weepage") from the bearing compartment. During some operating conditions of an engine, bleed air flow from the compressor section may be insufficient to provide suitable sealing of the bearing compartment. For example, during engine startup and sub-idle operating conditions, bleed air flow from the compressor section may be relatively low and may not provide suitable buffer air for sealing of the bearing compartment.

Figure 2:
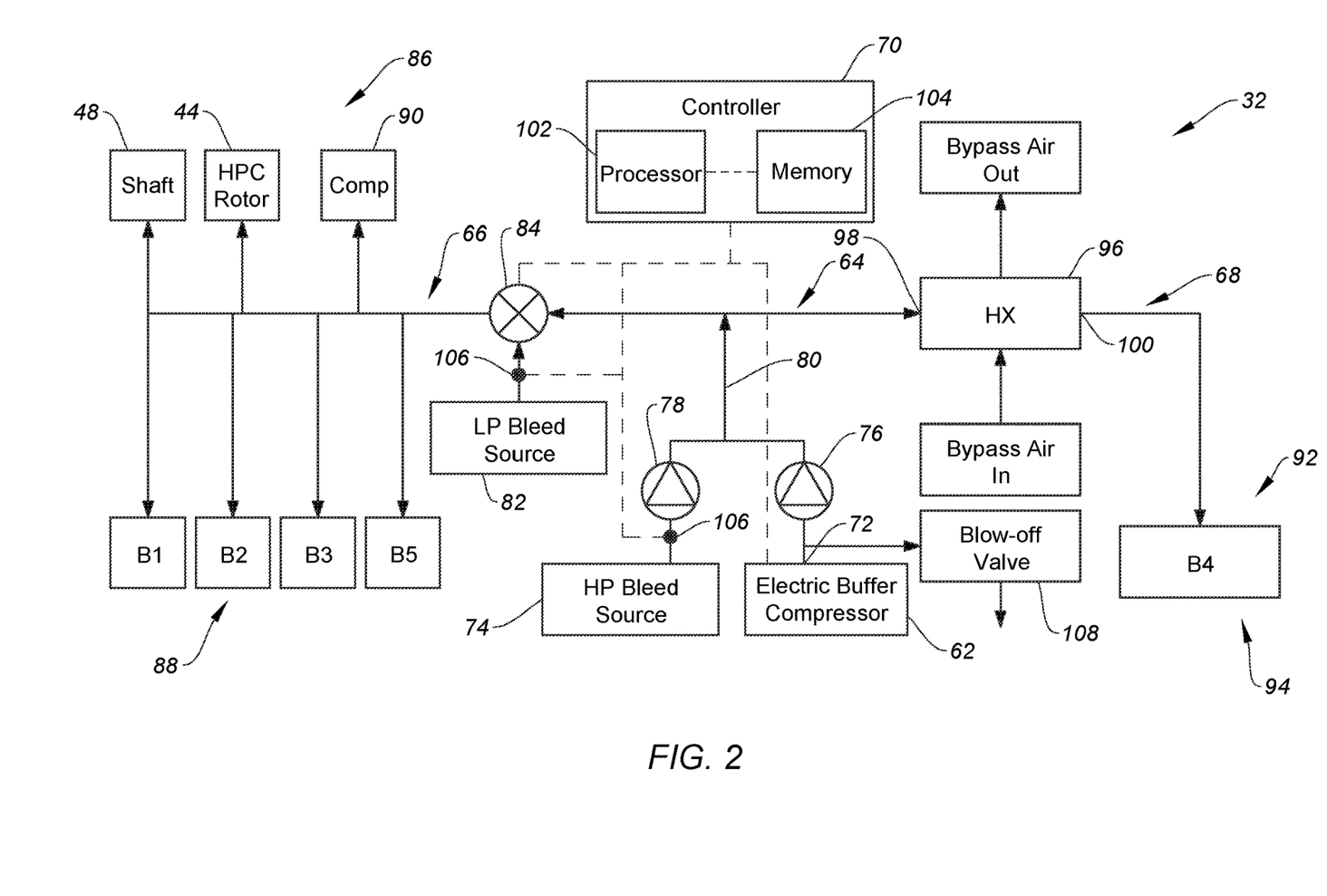
FIG. 2 schematically illustrates a buffer air assembly for an engine, in accordance with one or more embodiments of the present disclosure.

FIG. 2 schematically illustrates the buffer air assembly 32. The buffer air assembly 32 of FIG. 2 includes an electric buffer compressor 62, a supply header 64, a low-pressure header (LP header) 66, and a high-pressure header (HP header) 68. The buffer air assembly may further include a controller 70.

The electric buffer compressor 62 includes an air outlet 72 connected in fluid communication with the supply header 64. The electric buffer compressor 62 is configured to produce and supply pressurized air to the supply header 64. The electric buffer compressor 62 includes an electric motor which drives the electric buffer compressor 62 (e.g., a centrifugal compressor rotor) to compress air and direct the resultant pressurized air to the supply header 64. The electric buffer compressor 62 (e.g., the electric motor) may be electrically connected to an electric distribution system or other electric power source of the engine 20 and/or an aircraft on which the engine 20 is installed. For example, the electric buffer compressor 62 (e.g., the electric motor) may be electrically connected with a battery, a generator, an auxiliary power unit (APU), or the like to receive power for operation of the electric buffer compressor 62. The present disclosure, however, is not limited to the foregoing exemplary electrical power supply configurations. The electric buffer compressor 62 further includes an air inlet (not shown) through which the electric buffer compressor 62 draws air for compression and supply to the supply header 64. The air inlet may be configured to draw ambient air from any ambient air location or other air source such as, but not limited to, the bypass flow path 60, a compartment of the engine 20, an exterior of the engine 20, a compressor of the engine 20 (e.g., the low-pressure compressor 24A or the high-pressure compressor 24B), or the like.

The supply header 64 of FIG. 2 is connected in fluid communication with and between the electric buffer compressor 62, the LP header 66, and the HP header 68. The supply header 64 of FIG. 2 is further connected in fluid communication with a high-pressure bleed air (HP bleed) source 74. The HP bleed source 74 may be, for example, an intermediate stage (e.g., a third or fourth stage) of the high-pressure compressor 24B (see FIG. 1). The supply header 64 of FIG. 2 includes a first check valve 76 and a second check valve 78 configured to direct pressurized air from the electric buffer compressor 62 and the HP bleed source 74, respectively, to a common supply header line 80. The first check valve 76 is disposed in the supply header 64 between the electric buffer compressor 62 (e.g., the air outlet 72) and the common supply header line 80. The first check valve 76 is configured to obstruct (e.g., completely or substantially completely block) air flow in a direction from the common supply header line 80 to the electric buffer compressor 62 (e.g., the air outlet 72). The second check valve 78 is disposed in the supply header 64 between the HP bleed source 74 and the common supply header line 80. The second check valve 78 is configured to obstruct (e.g., completely or substantially completely block) air flow in a direction from the common supply header line 80 to the HP bleed source 74.

The LP header 66 is selectively connected in fluid communication with the supply header 64 and a low-pressure bleed air (LP bleed) source 82 by a buffer switching valve 84. For example, in a first position of the buffer switching valve 84, the LP header 66 may be connected in fluid communication with the supply header 64 to receive pressurized air from the supply header 64. In this first position of the buffer switching valve 84, the LP header 66 may be fluidly isolated from the LP bleed source 82. In a second position of the buffer switching valve 84, the LP header 66 may be connected in fluid communication with the LP bleed source 82 to receive pressurized air from the LP bleed source 82. In this second position of the buffer switching valve 84, the LP header 66 may be fluidly isolated from the supply header 64. The LP bleed source 82 may be, for example, an intermediate stage or discharge of the low-pressure compressor 24A (see FIG. 1). The LP header 66 is connected in fluid communication with one or more low-pressure bleed air loads (LP loads) 86 downstream of the buffer switching valve 84. The LP loads 86 of FIG. 2 include one or more bearing compartments 88 (e.g., for the bearing assemblies 56; see FIG. 1). For example, the bearing compartments 88 of FIG. 2 include bearing compartments B1, B2, B3, B5. The present disclosure, however, is not limited to any particular number of the bearing compartments 88. The LP header 66 is configured to supply pressurized air to the bearing compartments 88 for air buffering and/or cooling. The LP loads 86 of FIG. 2 further include the bladed first compressor rotor 44 and the second shaft 48 (see also FIG. 1). The bladed first compressor rotor 44 and the second shaft 48 of FIG. 2 are configured to receive pressurized air from the LP header 66 for air cooling. The LP loads 86 may additionally include one or more other engine components 90 configured to receive pressurized air from the LP header 66 for thermal conditioning such as, but not limited to, stator vanes, rotor blades, clearance control devices, and the like. The present disclosure, however, is not limited to the foregoing exemplary LP loads 86 of FIG. 2.

The HP header 68 is connected in fluid communication with the supply header 64 to receive pressurized air from the supply header 64. The HP header 68 is connected in fluid communication with one or more high-pressure bleed air loads (HP loads) 92. The HP loads 92 of FIG. 2 include one or more bearing compartments 94 (e.g., for the bearing assemblies 56; see FIG. 1). For example, the bearing compartments 94 of FIG. 2 include bearing compartment B4. The present disclosure, however, is not limited to any particular number of the bearing compartments 94. The HP header 68 is configured to supply pressurized air to the bearing compartments 94 for air buffering and/or cooling. The HP header 68 of FIG. 2 further includes a heat exchanger 96. The heat exchanger 96 is configured to cool high-temperature air which may be received from the supply header 64, for example, when the HP bleed source 74 is supplying pressurized air for the supply header 64. The heat exchanger 96 of FIG. 2 includes an air inlet 98 and an air outlet 100. The air inlet 98 is connected in fluid communication with the supply header 64. The air outlet 100 is connected in fluid communication with the HP loads 92 to direct cooled, pressurized air to the HP loads 92. The heat exchanger 96 is connected in fluid communication with a cooling fluid source for cooling the pressurized air flowing through the heat exchanger 96 from the air inlet 98 to the air outlet 100. For example, as shown in FIG. 2, the cooling fluid source may be air from the bypass flow path 60 (see FIG. 1). The present disclosure, however, is not limited to the foregoing exemplary cooling fluid source.

The controller 70 includes a processor 102 connected in signal communication with memory 104. The processor 102 may include any type of computing device, computational circuit, processor(s), CPU, computer, or the like capable of executing a series of instructions that are stored in the memory 104. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the buffer air assembly 32 to accomplish the same algorithmically and/or by coordination of buffer air assembly 32 components. For example, the controller 70 may be connected in signal communication with the electric buffer compressor 62, the buffer switching valve 84, and/or one or more sensors 106 (e.g., pressure sensors) of the buffer air assembly 32. The present disclosure is not limited to the foregoing exemplary sensor 106 locations illustrated in FIG. 2. The memory 104 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 70. The controller 70 may include, or may be in communication with, an input device that enables a user to enter data and/or instructions, and may include, or be in communication with, an output device configured, for example to display information (e.g., a visual display or a printer), or to transfer data, etc. Communications between the controller 70 and other electrical and/or electronic components of the buffer air assembly 32 may be via a hardwire connection or via a wireless connection. A person of skill in the art will recognize that portions of the controller 70 may assume various forms (e.g., digital signal processor, analog device, etc.) capable of performing the functions described herein.

The controller 70 may form or otherwise be part of an electronic engine controller (EEC) for the engine 20. The EEC may control operating parameters of the engine 20 including, but not limited to, fuel flow, stator vane position (e.g., variable compressor inlet guide vane (IGV) position), compressor air bleed valve position, shaft (e.g., first shaft 42 and/or second shaft 48) torque and/or rotation speed, etc. so as to control an engine power or performance of the engine 20. The EEC may modulate fuel flow to the combustor 34 to obtain a desired output power of the engine 20. For example, the EEC may modulate the fuel flow using a closed-loop process in which an output power or other operating parameter of the engine 20 is measured and fuel flow is increased or decreased as a function of the measured output power or operational parameter. In some embodiments, the EEC may be part of a full authority digital engine control (FADEC) system for the engine 20.

In operation, the buffer air assembly 32 and its electric buffer compressor 62 may be used to facilitate a suitable supply of buffer air during operating conditions of the engine 20 such as, but not limited to, a startup sequence for the engine 20 in which compressor bleed air (e.g., from the HP bleed source 74 and/or the LP bleed source 82) may initially be insufficient for providing suitable bearing compartment 88, 94 buffering. The startup sequence for the engine 20, including operation of the buffer air assembly 32 and its electric buffer compressor 62, may be controlled by the controller 70 in accordance with a startup sequence schedule or other control regime. The controller 70 may control (e.g., energize) the electric buffer compressor 62 to direct pressurized air to the LP header 66 and the HP header 68 through the supply header 64. The controller 70 may additionally control an air-powered starter motor or other engine starting assembly to drive initial rotation, for example, of the first rotational assembly 36 (e.g., the high-pressure spool; see FIG. 1). The present disclosure, however, is not limited to the foregoing exemplary engine starting assembly configuration. As the startup sequence progresses, air pressure from the HP bleed source 74 will increase such that the HP bleed source 74 may supply pressurized air for the LP loads 86 and the HP loads 92. The controller 70 may then deenergize the electric buffer compressor 62. The controller 70 may deenergize the electric buffer compressor 62 based on a predetermined period of time having elapsed since initiation of the startup sequence. Alternatively, the controller 70 may deenergize the electric buffer compressor 62 based on a measured air pressure from the HP bleed source 74 (e.g., using the sensors 106). For example, the controller 70 may deenergize the electric buffer compressor in response to identification of the measured air pressure from the HP bleed source 74 greater than or equal to a pressure threshold (e.g., a predetermined pressure threshold value indicative of sufficient pressurized air for buffering). The controller 70 may control the buffer switching valve 84 to isolate the LP header 66 from the supply header 64 and to direct pressurized air from the LP bleed source 82 to the LP loads 86 when the pressurized air from the LP bleed source 82 is sufficient for facilitating buffering and/or cooling for the LP loads 86. The controller 70 may position the buffer switching valve 84 to isolate the LP header 66 from the supply header 64 and to direct pressurized air from the LP bleed source 82 to the LP loads 86, for example, based on a predetermined period of time having elapsed since initiation of the startup sequence, one or more sensor 106 measurements, a programmed engine startup schedule, etc. Alternatively, the controller 70 may position the buffer switching valve 84 based on a measured air pressure from the LP bleed source 82 (e.g., using the sensors 106). For example, the controller 70 may position the buffer switching valve 84 in response to identification of the measured air pressure from the LP bleed source 82 greater than or equal to a pressure threshold (e.g., a predetermined pressure threshold value indicative of sufficient pressurized air for buffering). In the event of a failure of the electric buffer compressor 62, the configuration of the electric buffer compressor 62 and the HP bleed source 74 in fluid communication with the common supply header line 80 may allow the HP bleed source 74 to still provide pressurized air to facilitate at least some buffering and/or cooling for the LP loads 86 and the HP loads 92 during the startup sequence. While the operation of the buffer air assembly 32 is described above for an engine 20 startup sequence, it should be understood that the present disclosure electric buffer compressor 62 may additionally or alternatively be operated with the buffer air assembly 32 for an engine 20 shutdown sequence or another operating condition of the engine 20 in which compressor bleed air (e.g., from the HP bleed source 74 and/or the LP bleed source 82) may not be available or may not provide suitable pressurized air flow for buffering and/or cooling the LP loads 86 and/or the HP loads 92.

Still referring to FIG. 2, in some embodiments, the supply header 64 may additionally include a blow-off valve 108 connected in fluid communication with the electric buffer compressor 62 downstream of the air outlet 72. For example, the blow-off valve 108 may be connected in fluid communication with the electric buffer compressor 62 at (e.g., on, adjacent, or proximate) and/or downstream of the air outlet 72 and upstream of the first check valve 76, as shown in FIG. 2. The blow-off valve 108 may be configured as a pressure relief valve to prevent a surge of the electric buffer compressor 62 during certain operating conditions of the buffer air assembly 32. For example, an increase of the air pressure from the HP bleed source 74 above an outlet air pressure of the electric buffer compressor 62 may cause the first check valve 76 to shut, potentially causing a sudden increase in the outlet air pressure of the electric buffer compressor 62 (e.g., a surge). The blow-off valve 108 may relieve the air pressure at the air outlet 72 until the electric buffer compressor 62 can be deenergized (e.g., by the controller 70). Additionally or alternatively, the controller 70 may monitor the air pressure from the HP bleed source 74 and deenergize the electric buffer compressor 62 before the air pressure from the HP bleed source 74 increases above the outlet air pressure of the electric buffer compressor 62.

Figure 3:
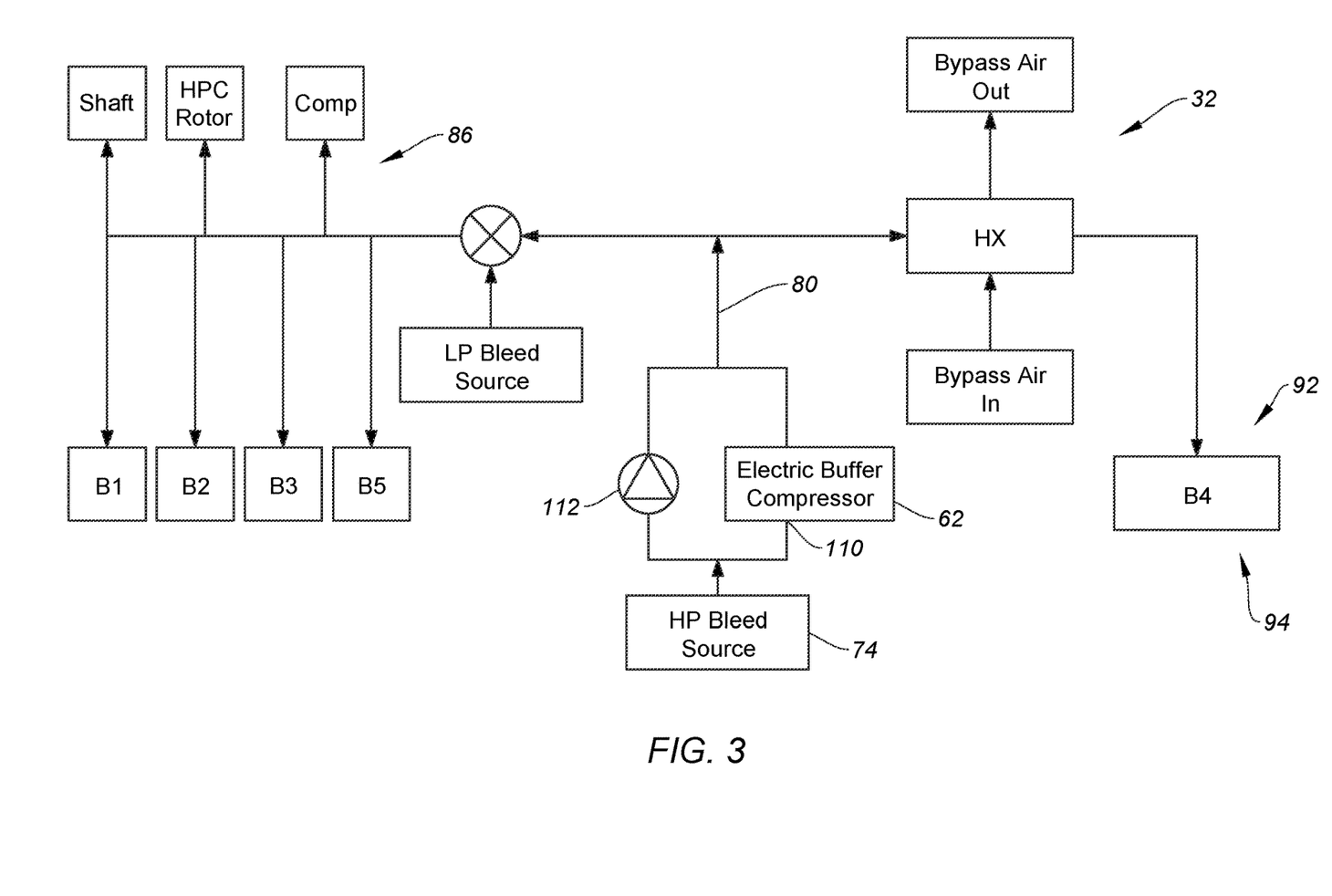
FIG. 3 schematically illustrates another buffer air assembly for an engine, in accordance with one or more embodiments of the present disclosure.

FIG. 3 schematically illustrates another embodiment of the buffer air assembly 32. The electric buffer compressor 62 of FIG. 3 includes an air inlet 110 connected in fluid communication with and downstream of the HP bleed source 74. The electric buffer compressor 62 may be arranged in parallel with a check valve 112, as shown in FIG. 3, such that the HP bleed source 74 may direct pressurized air to the electric buffer compressor 62 and the check valve 112 and the electric buffer compressor 62 and/or the check valve 112 may direct pressurized air to the common supply header line 80. The buffer air assembly 32 configuration of FIG. 3 facilitates boosting pressurized air from the HP bleed source 74 with the electric buffer compressor 62 to provide suitable pressurized air flow for buffering and/or cooling the LP loads 86 and/or the HP loads 92. The buffer air assembly 32 configuration of FIG. 3 also facilitates elimination of a check valve, in comparison to the buffer air assembly 32 of FIG. 2, thereby reducing buffer air assembly 32 weight and complexity. The buffer air assembly 32 configuration of FIG. 3 also exposes the electric buffer compressor 62 to high-temperature pressurized air from the HP bleed source 74.

Figure 4:
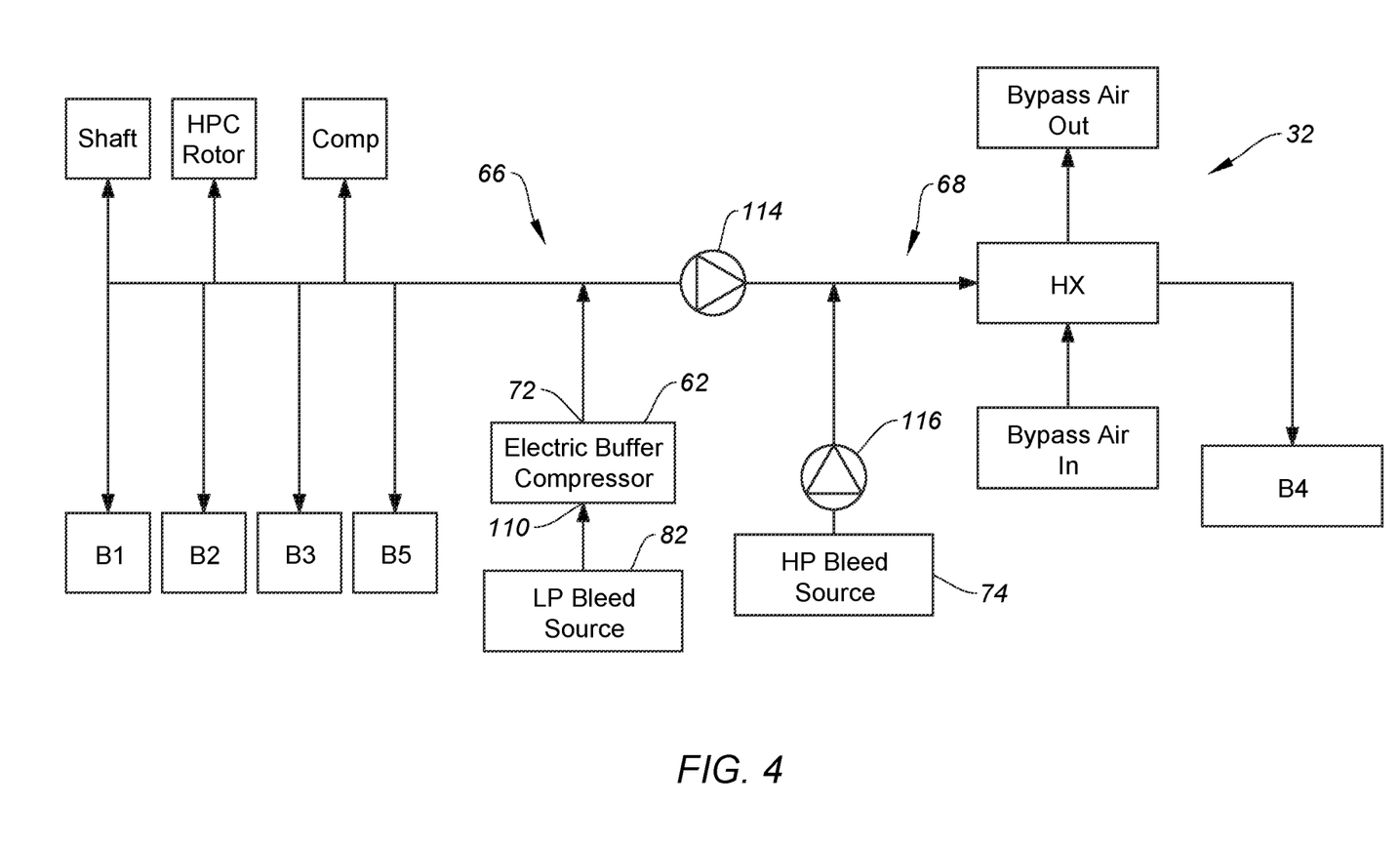
FIG. 4 schematically illustrates another buffer air assembly for an engine, in accordance with one or more embodiments of the present disclosure.

FIG. 4 schematically illustrates another embodiment of the buffer air assembly 32. The electric buffer compressor 62 of FIG. 4 includes the air inlet 110 connected in fluid communication with and downstream of the LP bleed source 82 and the air outlet 72 connected in fluid communication with the LP header 66. The LP header 66 of FIG. 4 is connected in fluid communication with the HP header 68 by a check valve 114. The check valve 114 is configured to direct pressurized air from the LP header 66 to the HP header 68. The check valve 114 is configured to obstruct (e.g., completely or substantially completely block) air flow in a direction from the HP header 68 to the LP header 66. The HP bleed source 74 is connected in fluid communication with the HP header 68 by a check valve 116. The check valve 116 is configured to direct pressurized air from the HP bleed source 74 to the HP header 68. The check valve 116 is configured to obstruct (e.g., completely or substantially completely block) air flow in a direction from the HP header 68 to the HP bleed source 74. In some embodiments, the electric buffer compressor 62 may be arranged in parallel with a check valve, similar to the electric buffer compressor 62 configuration shown in FIG. 3, such that the LP bleed source 82 may direct pressurized air to the electric buffer compressor 62 and the check valve and the electric buffer compressor 62 and/or the check valve may direct pressurized air to the LP header 66. The buffer air assembly 32 configuration of FIG. 4 facilitates boosting pressurized air from the LP bleed source 82 with the electric buffer compressor 62 to provide suitable pressurized air flow for buffering and/or cooling the LP loads 86 and/or the HP loads 92. As air pressure from the HP bleed source 74 increases, for example, during a startup sequence for the engine 20 (see FIG. 1), the pressurized air from the HP bleed source 74 may cause the check valve 116 to close such that only the HP bleed source 74 supplies pressurized air for the HP header 68. The buffer air assembly 32 configuration of FIG. 4 may facilitate elimination of a buffer switching valve (e.g., the buffer switching valve 84; see FIG. 2), thereby reducing buffer air assembly 32 weight and complexity. The buffer air assembly 32 configuration of FIG. 4 also exposes the electric buffer compressor 62 to high-temperature pressurized air from the LP bleed source 82 to a less degree in comparison to the buffer air assembly 32 configuration of FIG. 3.

Figure 5:
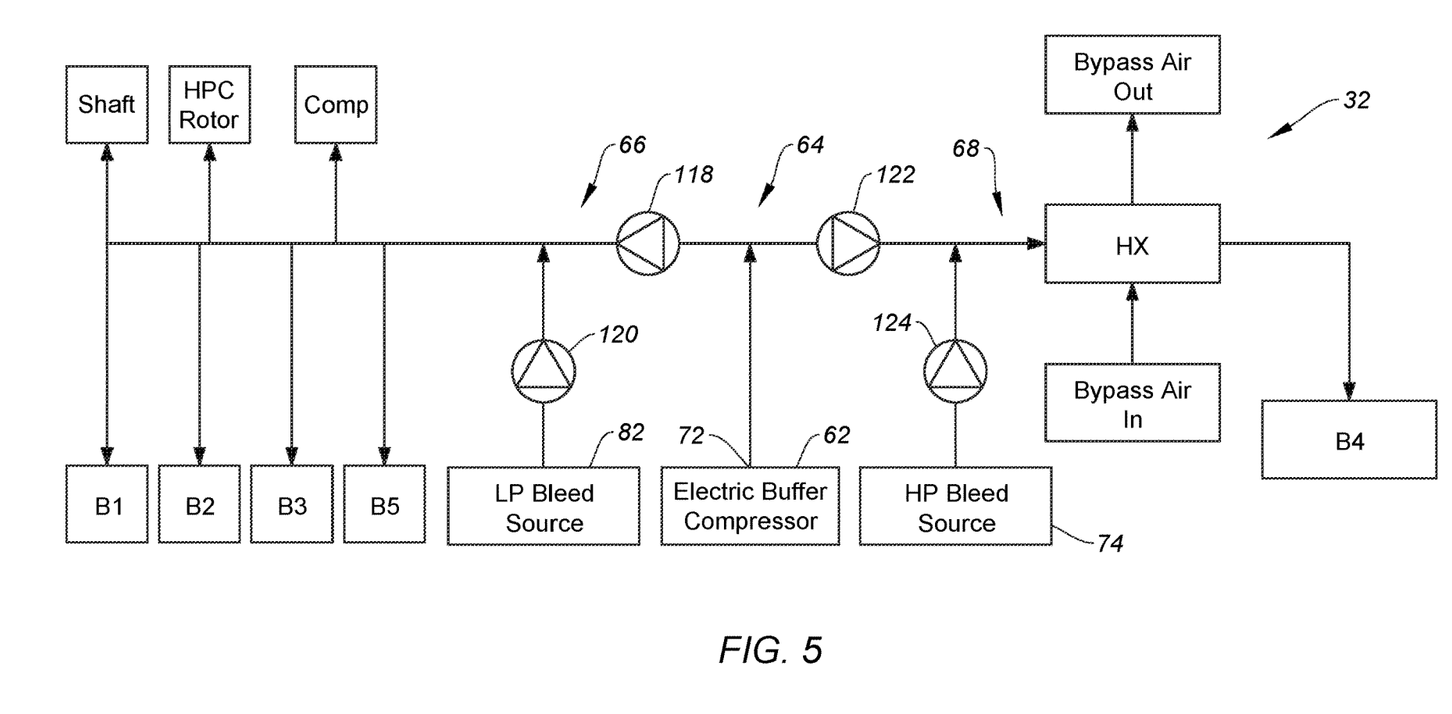
FIG. 5 schematically illustrates another buffer air assembly for an engine, in accordance with one or more embodiments of the present disclosure.

FIG. 5 schematically illustrates another embodiment of the buffer air assembly 32. The electric buffer compressor 62 of FIG. 5 includes the air outlet 72 connected in fluid communication with the supply header 64. The supply header 64 is connected in fluid communication with the LP header 66 by a check valve 118. The check valve 118 is configured to direct pressurized air from the supply header 64 to the LP header 66. The check valve 118 is configured to obstruct (e.g., completely or substantially completely block) air flow in a direction from the LP header 66 to the supply header 64. The LP bleed source 82 is connected in fluid communication with the LP header 66 by a check valve 120. The check valve 120 is configured to direct pressurized air from the LP bleed source 82 to the LP header 66. The check valve 120 is configured to obstruct (e.g., completely or substantially completely block) air flow in a direction from the LP header 66 to the LP bleed source 82. The supply header 64 is connected in fluid communication with the HP header 68 by a check valve 122. The check valve 122 is configured to direct pressurized air from the supply header 64 to the HP header 68. The check valve 122 is configured to obstruct (e.g., completely or substantially completely block) air flow in a direction from the HP header 68 to the supply header 64. The HP bleed source 74 is connected in fluid communication with the HP header 68 by a check valve 124. The check valve 124 is configured to direct pressurized air from the HP bleed source 74 to the HP header 68. The check valve 124 is configured to obstruct (e.g., completely or substantially completely block) air flow in a direction from the HP header 68 to the HP bleed source 74. The buffer air assembly 32 configuration of FIG. 5 may facilitate elimination of a buffer switching valve (e.g., the buffer switching valve 84; see FIG. 2), thereby reducing buffer air assembly 32 weight and complexity.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A buffer air assembly for an aircraft engine, the buffer air assembly comprising:
   a low-pressure header connected to at least one low-pressure bearing compartment;
   a high-pressure header connected to at least one high-pressure bearing compartment;
   a low-pressure bleed air source connected to the low-pressure header, and the low-pressure bleed air source is configured to direct a low-pressure buffering air to the at least one low-pressure bearing compartment through the low-pressure header;
   a high-pressure bleed air source configured to direct a high-pressure buffering air to the at least one high-pressure bearing compartment through the high-pressure header;
   an electric buffer compressor connected to the low-pressure header and the high-pressure header, and the electric buffer compressor is configured to direct pressurized buffering air to the low-pressure header and the high-pressure header; and
   a buffer switching valve selectively connecting the low-pressure bleed air source and the electric buffer compressor to the at least one low-pressure bearing compartment, the buffer switching valve is positionable in a first position and a second position, the buffer switching valve connects the electric buffer compressor to the at least one low-pressure bearing compartment in the first position, and the buffer switching valve connects the low-pressure bleed air source to the at least one low-pressure bearing compartment in the second position.

2. The buffer air assembly of claim 1, further comprising a supply header connecting the low-pressure header and the high-pressure header.

3. The buffer air assembly of claim 2, wherein the high-pressure bleed air source and the electric buffer compressor are connected to the low-pressure header and the high-pressure header by the supply header.

4. The buffer air assembly of claim 2, wherein the supply header includes a first check valve, a second check valve, and a common supply header line, the first check valve connects the electric buffer compressor to the common supply header line, and the second check valve connects the high-pressure bleed air source to the common supply header line.

5. The buffer air assembly of claim 2, wherein the electric buffer compressor includes an air inlet and an air outlet, the air inlet is connected to the high-pressure bleed air source and configured to receive the high-pressure buffering air from the high-pressure bleed air source, and the air outlet is connected to the high-pressure header and the low-pressure header.

6. The buffer air assembly of claim 5, wherein the supply header includes a check valve connecting the high-pressure bleed air source to the high-pressure header and the low-pressure header, and the check valve is arranged in parallel with the electric buffer compressor.

7. The buffer air assembly of claim 1, wherein the electric buffer compressor includes an air outlet, the buffer air assembly further comprising a blow-off valve connected at the air outlet.

8. The buffer air assembly of claim 1, further comprising a controller connected in signal communication with the electric buffer compressor, and the controller includes a processor in communication with a non-transitory memory storing instructions, which instructions when executed by the processor, cause the processor to:
   energize the electric buffer compressor to direct the pressurized buffering air to the low-pressure header and the high-pressure header.

9. The buffer air assembly of claim 8, wherein the instructions, when executed by the processor, further cause the processor to:
   deenergize the electric buffer compressor while maintaining the buffer switching valve in the first position subsequent to energizing the electric buffer compressor to direct the pressurized buffering air to the low-pressure header and the high-pressure header.

10. The buffer air assembly of claim 9, wherein the instructions, when executed by the processor, further cause the processor to:
    measure a first pressure of the high-pressure buffering air and deenergize the electric buffer compressor in response to identification of the measured first pressure greater than or equal to a first pressure threshold.

11. The buffer air assembly of claim 9, wherein the instructions, when executed by the processor, further cause the processor to:
    position the buffer switching valve in the second position subsequent to deenergizing the electric buffer compressor.

12. The buffer air assembly of claim 11, wherein the instructions, when executed by the processor, further cause the processor to:
    measure a second pressure of the low-pressure buffering air and position the buffer switching valve in the second position in response to identification of the measured second pressure greater than or equal to a second pressure threshold.

13. An engine for an aircraft, the engine comprising:
    a low-pressure compressor;
    a high-pressure compressor; and
    a buffer air assembly including:
      a low-pressure header connected to at least one low-pressure bearing compartment and the low-pressure compressor, and the low-pressure header is configured to receive a low-pressure buffering air from the low-pressure compressor;
      a high-pressure header connected to at least one high-pressure bearing compartment and the high-pressure compressor, and the high-pressure header is configured to receive a high-pressure buffering air from the high-pressure compressor; and
      an electric buffer compressor connected to the low-pressure header and the high-pressure header, and the electric buffer compressor is configured to direct pressurized buffering air to the low-pressure header and the high-pressure header.

14. The engine of claim 13, further comprising a controller connected in signal communication with the electric buffer compressor, and the controller includes a processor in communication with a non-transitory memory storing instructions, which instructions when executed by the processor, cause the processor to:
    control an engine startup sequence for the engine, the engine startup sequence including energizing the electric buffer compressor to direct the pressurized buffering air to the low-pressure header and the high-pressure header.

15. The engine of claim 13, further comprising:
- a first rotational assembly including the high-pressure compressor;
- a second rotational assembly including the low-pressure compressor;
- at least one high-pressure bearing assembly rotatably supporting the first rotational assembly, and the at least one high-pressure bearing assembly is connected to the high-pressure header; and
- at least one low-pressure bearing assembly rotatably supporting the second rotational assembly, and the at least one low-pressure bearing assembly is connected to the low-pressure header.

16. A buffer air assembly for an aircraft engine, the buffer air assembly comprising:
- a low-pressure header connected to at least one low-pressure bearing compartment;
- a high-pressure header connected to at least one high-pressure bearing compartment;
- a supply header interconnecting the low-pressure header and the high-pressure header;
- a low-pressure bleed air source connected to the low-pressure header, and the low-pressure bleed air source is configured to direct a low-pressure buffering air to the at least one low-pressure bearing compartment through the low-pressure header;
- a high-pressure bleed air source connected to the supply header, and the high-pressure bleed air source is configured to direct a high-pressure buffering air to the at least one low-pressure bearing compartment and the at least one high-pressure bearing compartment;
- an electric buffer compressor connected to the supply header, and the electric buffer compressor is configured to direct pressurized buffering air to the at least one low-pressure bearing compartment and the at least one high-pressure bearing compartment; and
- a buffer switching valve disposed between the supply header and the low-pressure header, the buffer switching valve is positionable in a first position and a second position, the buffer switching valve connects the supply header to the low-pressure header in the first position, and the buffer switching valve connects the low-pressure bleed air source to the low-pressure header in the second position.

* * * * *